(No Model.)
N. W. PRATT.
DEVICE FOR ATTACHING PRESSURE GAGES IN POSITION.
No. 533,233.      Patented Jan. 29, 1895.
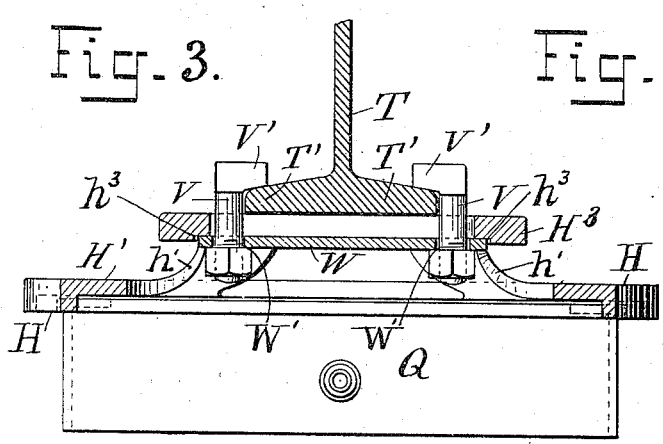
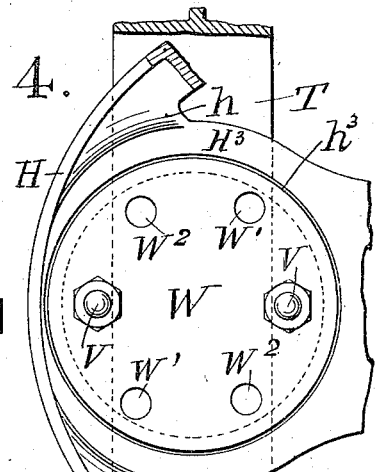
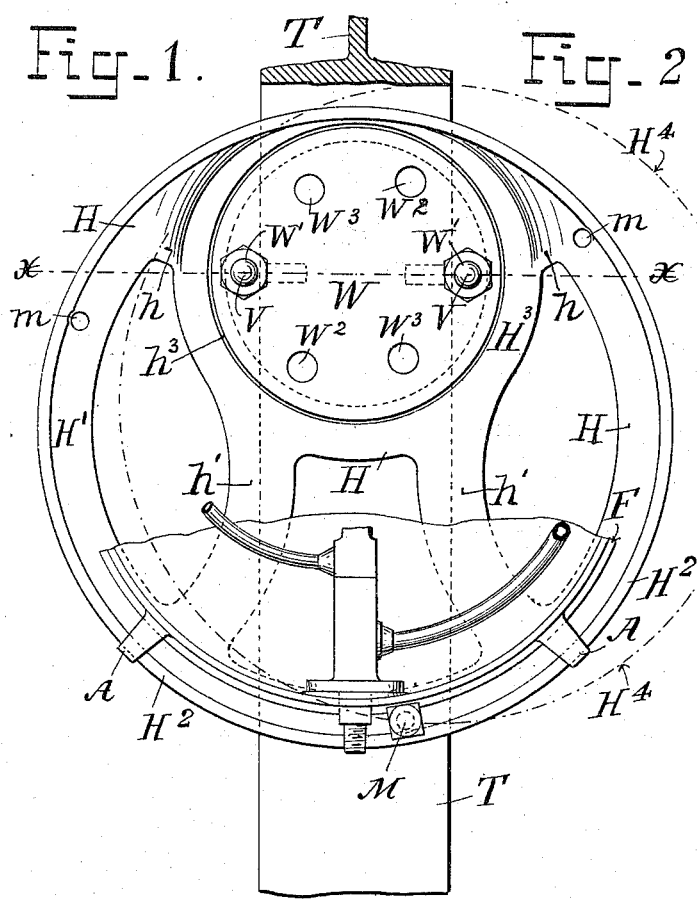
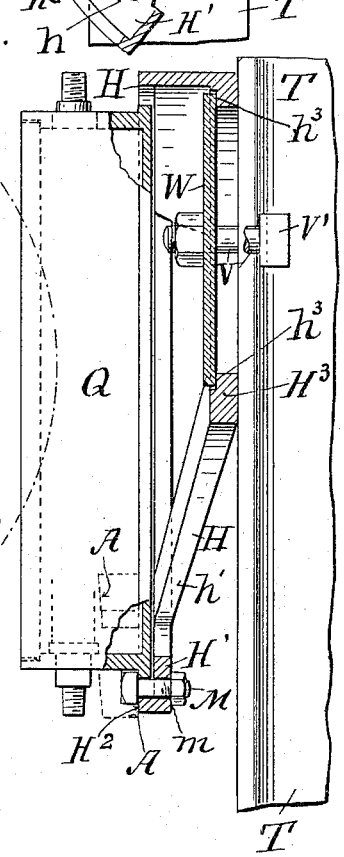

UNITED STATES PATENT OFFICE.

NAT. W. PRATT, OF BROOKLYN, NEW YORK.

DEVICE FOR ATTACHING PRESSURE-GAGES IN POSITION.

SPECIFICATION forming part of Letters Patent No. 533,233, dated January 29, 1895.

Application filed March 31, 1894. Serial No. 505,910. (No model.)

*To all whom it may concern:*

Be it known that I, NAT. W. PRATT, a citizen of the United States, residing in the city of Brooklyn, Kings county, State of New York, have invented certain new and useful Improvements in Devices for Attaching Pressure-Gages in Position, of which the following is a specification.

In the attachment of pressure-gages to boiler-fronts, particularly when such fronts are of an ornamental character, it is desirable that the gage shall occupy a certain lateral position with relation to the parts or design of the front, in order that a preferable or the best effect may be secured; but it is often the case that the vertical support or flanged column to which the gage is to be attached, is only approximately in the place it should be to allow this result to be attained by the ordinary means for mounting the gage.

The objects of the invention are to provide a means for attaching the gage, which will enable any lateral position within certain limits to be attained, and the dial to stand in proper relation to the eye, as well as to enable the gage to be located higher or lower on the front.

To these ends the invention consists in certain features of construction and arrangement hereinafter described and claimed.

In the accompanying drawings Figure 1 represents a front view of my improved gage-supporting device for mounting the gage in position, a [portion of the gage being shown thereon, and the column to which the device is secured being represented. Fig. 2 shows a side view of said column, a central vertical section of the gage supporting-device, and a side view of the gage, a portion of which is represented in section. Fig. 3 shows a horizontal section of the supporting device on line X X of Fig. 1, and a top view of the gage. Fig. 4 represents a front view of the column and a portion of the supporting-device in an extreme position of adjustment.

In the main, the supporting-device consists of a frame or plate upon which the gage can be secured and adjusted circumferentially; a disk eccentrically located on said plate and forming a bearing upon which the frame can be adjusted by being rotated; and means for securing the frame and disk to a support in a fixed position.

H represents the frame or plate, which is shown as of skeleton form, with an outer ring portion H', having a peripheral flange $H^2$, and an inner ring portion $H^3$, which is connected at the top to the ring H' by arms $h$, and at the bottom by arms $h'$, the ring $H^3$ being located in the rear of the ring H', so that the whole frame is dish-shaped. On the inner edge of its face, the ring-portion $H^3$ is provided with an annular socket or depression $h^3$, in which a disk W fits and upon this disk the frame H can be rotated as indicated by broken lines in Fig. 1.

The means for securing or clamping the frame H and disk W to a support, may be any that are suitable, but in order that they may be attached to the flange T', of an I-shaped or T shaped column T, two L-shaped clamping bolts V, V', are shown as being employed, which engage the flange, pass through holes in the disk W, and are provided with nuts, the setting up of which clamps the frame and disk in a fixed position.

In order that provision may be made for securing the frame and disk to flanges of various widths, the disk W is supplied with several pairs of holes, as W', $W^2$, $W^3$, the diametrical distances between those of the respective pairs differing in a desirable amount; or a single pair of holes in the form of slots $w$, as shown by dotted lines in Fig. 1 may be used; or a single pair of holes located at the greatest necessary distance apart may be employed, and the disk be turned axially for narrower flanges.

The gage case Q is furnished with three or more radial fingers A, and is provided with a circumferential flange F; and the ring H' is supplied with three or more holes $m$ to receive bolts M, the heads of which overlie the flange F, so that when the nuts on these bolts are screwed up the fingers A on the gage-case will be clamped upon the flange $H^2$ and the gage thereby secured upon the frame H.

In attaching a gage to a boiler front, the disk W is placed in its socket $h^3$ in the frame H; the bolts Y are passed through the proper pair of holes (or through the slots $w$), and the nuts are applied to these bolts and partially screwed up. The ring H³ is then placed against the flange T' of the column T, at the desired height, the feet V' of the bolts are turned to overlie this flange, and the nuts are screwed up enough farther to prevent the frame H from slipping on the column. The frame is now partially rotated to the right or left upon the disk W until it occupies the desired lateral position upon the boiler front, when the nuts on the bolts V are screwed home and the frame and disk thereby clamped to the column in a fixed position. The gage is now placed upon the ring H'; the bolts M are inserted in the holes $m$ in the ring; and the nuts are applied to these bolts and screwed home, thereby firmly securing the gage to the frame H; but before the final turns upon these nuts the gage can be adjusted circumferentially so that its zero mark will occupy the proper position to the eye, as will be readily understood.

It is perfectly obvious that the fingers A on the gage case Q may be omitted and the flange F thereon be made of sufficient width to overlie the flange H² and be provided with curved slots through which the shanks of the bolts M shall pass—or such flange be provided with holes to receive the bolt shanks and the holes $m$ in the ring H' be elongated into curved slots—to allow of a proper circumferential adjustment of the gage with relation to the frame H, all of which is too readily seen to need illustration.

What I claim as my invention, and desire to secure by Letters Patent, is—

1. A device for mounting pressure-gages upon a support, consisting of a frame to which the gage can be adjustably secured; a disk located eccentrically to the frame and forming a bearing upon which the frame can be rotated; and means for clamping the disk and frame in a fixed position upon the support, substantially as set forth.

2. In a device for mounting pressure-gages upon a support, a frame to which the gage can be adjustably secured, a disk located eccentrically to the frame and having two or more holes, and forming a bearing upon which the frame can be swung or rotated, and clamps passing through the holes in the disk for securing the disk and frame in a fixed position upon the support, substantially as set forth.

3. The combination of a gage-case having a peripheral flange, a frame having a flange underlying that on the case, means for engaging the flange on the case and clamping the case upon the flanged frame in an adjusted position, and means for securing said frame in a fixed position upon a support, substantially as set forth.

4. The combination of a gage-case having a peripheral flange, a frame having a flange underlying that on the case, means for engaging the flange on the case and clamping the case upon the flanged frame in an adjusted position, a disk located eccentrically to the frame and forming a bearing upon which the frame can be rotated, and means for clamping the disk and frame in a fixed position upon a support, substantially as set forth.

5. The combination with a gage-case having a peripheral flange; a frame having a flange underlying that on the case, means for engaging the flange on the case and clamping the case upon the flanged frame in an adjusted position, a disk located eccentrically to the frame and having two or more holes, and forming a bearing upon which the frame can be swung or rotated, and clamps passing through the holes in the disk for securing the disk and frame in a fixed position upon a support, substantially as set forth.

NAT. W. PRATT.

Witnesses:
H. T. DE PUY,
EDSON SALISBURY JONES.